United States Patent
Tanaka

Patent Number: 5,832,126
Date of Patent: Nov. 3, 1998

[54] METHOD AND APPARATUS FOR COMPRESSING MIXED TEXT AND IMAGE DATA

[75] Inventor: Kimiyuki Tanaka, Tokyo, Japan

[73] Assignee: Oki Data Corporation, Tokyo, Japan

[21] Appl. No.: 675,047

[22] Filed: Jul. 3, 1996

[30] Foreign Application Priority Data

Jul. 7, 1995 [JP] Japan ................................ 7-171797
Jun. 10, 1996 [JP] Japan ................................ 8-147015

[51] Int. Cl.⁶ ........................................ G06K 9/00
[52] U.S. Cl. ................................ 382/239; 382/176
[58] Field of Search ................................ 382/168, 169, 382/170, 171, 172, 173, 174, 175, 176, 177, 178, 179, 180, 181, 232, 233, 234, 235, 237, 239, 240, 244, 245, 246, 248, 249, 250, 251, 252, 253, 238; 358/426, 261.1, 261.2, 261.3, 262.1, 430, 433, 464, 450, 453

[56] References Cited

U.S. PATENT DOCUMENTS

| | | | |
|---|---|---|---|
| 4,879,753 | 11/1989 | El Sherbini | 382/176 |
| 4,899,394 | 2/1990 | Lee | 382/9 |
| 5,040,233 | 8/1991 | Pavy et al. | 382/239 |
| 5,125,045 | 6/1992 | Murakami et al. | 382/50 |
| 5,131,053 | 7/1992 | Bernzott et al. | 382/176 |
| 5,151,949 | 9/1992 | Miyata | 382/9 |
| 5,182,656 | 1/1993 | Chevion et al. | 358/452 |
| 5,226,098 | 7/1993 | Hirosawa | 382/61 |
| 5,303,313 | 4/1994 | Mark et al. | 382/56 |
| 5,335,290 | 8/1994 | Cullen et al. | 382/176 |
| 5,392,362 | 2/1995 | Kimura et al. | 382/239 |

Primary Examiner—Leo H. Boudreau
Assistant Examiner—Bijan Tadayon
Attorney, Agent, or Firm—Rabin & Champagne, P.C.

[57] ABSTRACT

To convert a mixture of text data and dot-mapped image data to compressed dot-mapped data not exceeding a given size, the text data are converted to dot-mapped data, then losslessly compressed, after which the dot-mapped image data are down-sampled as necessary. To compress dot-mapped data to within a given size, lossless compression, lossy compression, and down-sampling followed by compression are attempted until the necessary size reduction is achieved. To convert a page of object data to compressed dot-mapped data, the objects are classified and prioritized, then rasterized and compressed by different methods according to their priorities. The compression ratios are predicted and monitored, and the compression parameters are modified according to the prediction error.

39 Claims, 16 Drawing Sheets

METHOD AND APPARATUS FOR COMPRESSING MIXED TEXT AND IMAGE DATA

BACKGROUND OF THE INVENTION

The present invention relates to a method and apparatus for converting a document containing both text and images to compressed, dot-mapped data, preparatory to transmission of the data from a computer to a peripheral device with limited receive buffer space.

Modern page description languages or mark-up languages enable a computer-generated document to contain not only text, but also information describing such text attributes as font name and character size. The document may additionally include diagrams generated by graphics drawing commands, or embedded dot-mapped images.

Such a document can be attractively printed by a printer equipped to interpret the page description or mark-up language. Such a printer must have a powerful processor, much memory space, and an extensive store of font data. Inexpensive printers provide none of these facilities, so the interpreting must be done in the computing device, and data must be transmitted to the printer in ready-to-print form. Basically, this means that the data must be sent as a dot map of the page to be printed, comprising one or more bits specifying the value of each dot on the page.

So-called page printers must often receive an entire page of data before they can begin printing the page, but the dot map of an entire page can be rather large. If the printer has a resolution of 300 dots per inch (DPI), for example, then even if each dot requires only one bit, the dot map of a page of A4 size takes up about one megabyte of memory space. For a 600 DPI printer, this value becomes about four megabytes. Inexpensive printers are generally incapable of storing that much dot data, so they must receive the data in a compressed form, and expand the data during the printing process.

Compression methods are classified as lossless, meaning that they permit recovery of an exact copy of the original data, or lossy, meaning that only an approximate copy of the original data can be recovered. Lossless methods include, for example, run-length methods, which encode the length of a run of identical dots, dictionary-based methods, which construct dictionaries of recurring dot patterns, and methods based on arithmetic coding. Lossy methods are generally based on mathematical transforms, such as the widely-used discrete cosine transform (DCT). Lossy methods often permit the degree of loss, and thereby the compression ratio, to be controlled by a parameter setting.

With all of these methods, however, the compression ratio depends strongly on the nature of the data, and is difficult to predict in advance. Dot-mapped text can generally be compressed much more than can dot-mapped natural images, but some text fonts compress better than others, and with image data, the compression ratio is extremely variable. Thus it is not easy to decide what compression method to use for sending dot data to a printer, especially for pages containing both text and graphics. If the wrong method is selected, the quality of the printed output will be unacceptably low, or the printer's buffer will overflow. In the past, this has been a major obstacle to the use of low-cost page printers for printing documents with a high-quality appearance.

This problem is not limited to page printers, but occurs whenever dot data must be sent to a printer, or other peripheral device, having limited buffer space.

The same problem occurs when the dot data must be compressed, not because of limited buffer space, but in order to speed up the transmission of the data.

SUMMARY OF THE INVENTION

It is accordingly an object of the present invention to compress dot data representing both text and images to within a given data size, without compromising text quality.

Another object of the invention is to transmit dot data representing both text and images rapidly, without compromising text quality.

Yet another object is to enable documents generated using a page description language to be printed with acceptable quality by a low-cost printer.

Still another object is to avoid the printing of pages with unacceptable quality.

A first aspect of the invention converts a mixture of text data and dot-mapped image data to compressed dot-mapped data not exceeding a given size. The text data are separated from the dot-mapped image data, converted to dot-mapped text data, then compressed by a lossless compression method, and the size of the resulting compressed text data is calculated. This size is subtracted from the given size to determine the available remaining size, and a down-sampling ratio is calculated that will compress the dot-mapped image data to within this remaining size. If the down-sampling ratio is greater than unity, the dot-mapped image data are down-sampled according to the calculated down-sampling ratio, the resolution of the dot-mapped image data being thereby reduced.

A second aspect of the invention compresses arbitrary dot-mapped data to within a given size. The dot-mapped data are first compressed by a lossless compression method. If the resulting compressed data are not within the given size, the resulting compressed data are discarded, and the dot-mapped data are compressed by a lossy compression method that does not change the dot resolution of the data. If the resulting compressed data are still not within the given size, the resulting compressed data are again discarded, and the dot-mapped data are down-sampled, reducing the resolution.

A third aspect of the invention converts data describing a group of objects to dot-mapped data not exceeding a given size. The objects are classified according to type, and assigned priorities according to their type and size. Compression parameters are assigned to the objects on the basis of their priorities, and a compression ratio is predicted for each object. Those objects that are not already in dot-mapped data form are converted to dot-mapped data, and the dot-mapped data of each object are compressed according to the assigned compression parameters. As compression proceeds, the results are monitored, and the compression parameters are adjusted if the actual and predicted compression ratios differ significantly.

DETAILED DESCRIPTION OF THE PREFERRED EMBODIMENTS

Embodiments of the invention will be described with reference to the attached illustrative drawings.

The invention prepares data for transmission from a computing device to a peripheral device. The computing device may be a personal computer, workstation, or any other type of computing device. The peripheral device described in the embodiments will be a printer, but it will be clear that the invention is applicable to other types of peripheral devices as well.

The invention can be practiced by providing the computing device with either specialized hardware or specialized software. One example of the type of specialized hardware that can be provided is an application-specific integrated circuit mounted on an interface card. One example of specialized software is a group of software modules incorporated into a device driver. Other types of specialized hardware or software may also be employed.

Figure 1:
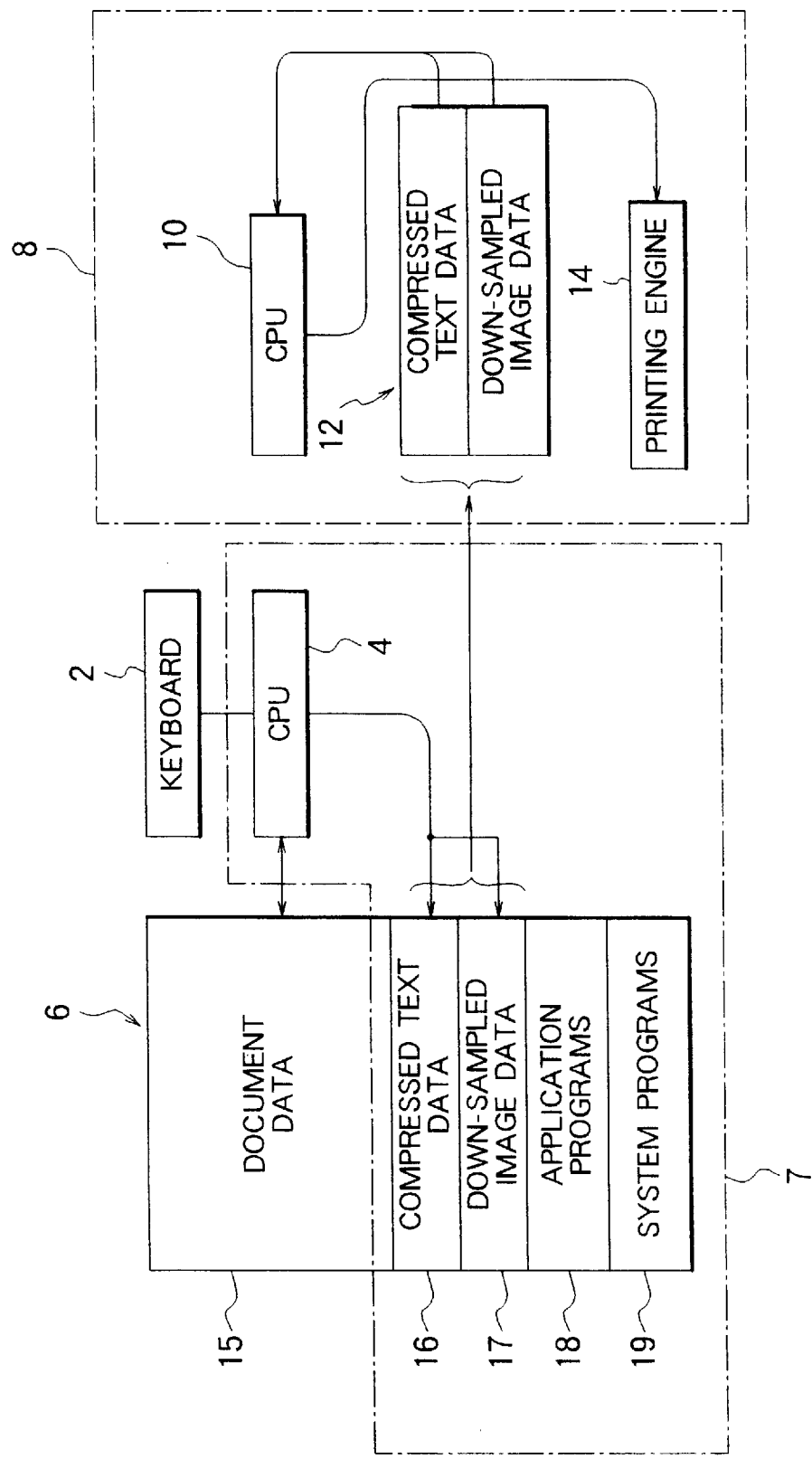
FIG. 1 is a block diagram showing elements of a computer and printer related to the present invention.

FIG. 1 shows an example of an environment in which the invention can be practiced by means of software. The computing device comprises a keyboard 2, a central processing unit (CPU) 4, and a memory 6. The memory 6 is an aggregate of various types of memory devices, such as random-access semiconductor memory, read-only semiconductor memory, and rotating disk memory devices. The parts of the computing device that are directly related to the invention are enclosed in a dot-dash line 7.

The computing device is coupled to a printer 8 having its own CPU 10, a receive buffer 12, and a printing engine 14. The receive buffer 12 comprises, for example, random-access semiconductor memory. The printing engine may comprise any type of device that prints by forming dots on a page. Well-known examples of such devices include ink-jet printing heads, dot-matrix impact printing heads, and electrophotographic devices employing lasers or light-emitting diodes.

The memory 6 of the computing device comprises areas 15, 16, 17, 18, and 19 for storing document data, compressed text data, down-sampled dot-mapped image data, application programs, and system programs. The CPU 4 executes the application programs stored in area 18 to enable a user at the keyboard 2 to create various types of document files in the document data memory area 15. These document files may contain text, dot-mapped image data, and invisible information such as header information, embedded control codes, or commands conforming to the syntax of a page description language or mark-up language.

When a document file is printed, the application program that created the document, or one of the system programs in the system program area 19, processes the document and its invisible information. As part of this process, the CPU 4 executes certain application or system software embodying the present invention. According to the first aspect of the invention, this software converts the text data to dot-mapped text data, then compresses the dot-mapped text data and down-samples the dot-mapped image data. The compressed text data are stored in memory area 16, and the down-sampled image data in memory area 17.

Next, the data stored in areas 16 and 17 are transmitted to the printer 8 and stored in the receive buffer 12. To print the data, the printer's CPU 10 expands the text data, up-samples the image data, and sends the resulting dot-mapped data to the printing engine 14, one raster line at a time.

The second and third aspects of the invention, when practiced in software, operate in a similar environment, except that memory areas 16 and 17 are replaced by other areas used for different purposes, as will be described below. When the invention is practiced by hardware means, the compression and down-sampling processes, or these processes and the process of converting the text data to dot-mapped form, are executed not by the CPU 4, but by separately provided facilities which will be shown in the following drawings.

Figure 2:
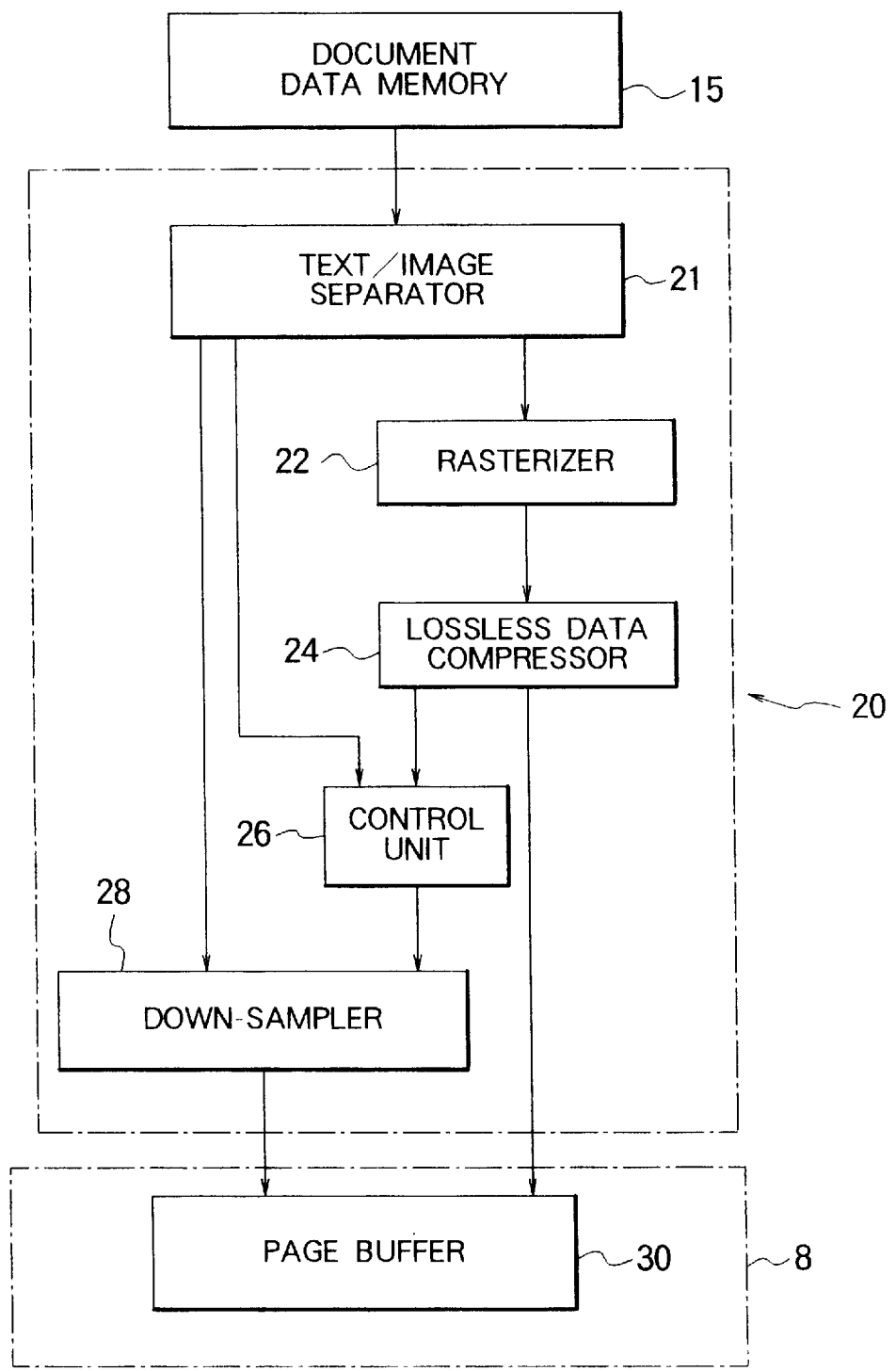
FIG. 2 is a functional block diagram of a first embodiment of the invented apparatus.

FIG. 2 shows a first embodiment, illustrating the first aspect of the invention. The printer 8 and document data memory 15 are as shown in FIG. 1. Document data are supplied to the printer 8 through a data conversion system 20 comprising a text/image separator 21, a rasterizer 22, a lossless data compressor 24, a control unit 26, and a down-sampler 28. The data conversion system 20 is installed in a computing device as, for example, an interface card, or a system program, or as part of an application program. The receive buffer in the printer 8 is a page buffer 30, in which all the data to be printed on one page must be stored. The size Mp of the page buffer 30 is known to the data conversion system 20.

Next the operation of the first embodiment will be described, with reference to FIGS. 2, 3, and 4.

When a document file in the document data memory 15 is printed, the document data are sent to the printer 8 one page at a time. Transmission of each page begins when a signal is received from the printer 8, indicating that the page buffer 30 is empty and ready to receive the next page of data.

The document data describing the page are first passed to the text/image separator 21, either directly, or through an application program or system program. It will be assumed in this embodiment that the text/image separator 21 receives text data in the form of character codes, together with text header information, and image data in the form of a dot map, together with image header information. Text header information specifies such text attributes as the font name and character size, and text positioning information. Image header information specifies the height and width of the image, i.e. the number of dot lines and the width of each dot line in the image, and the position of the image on the page.

Figure 3:
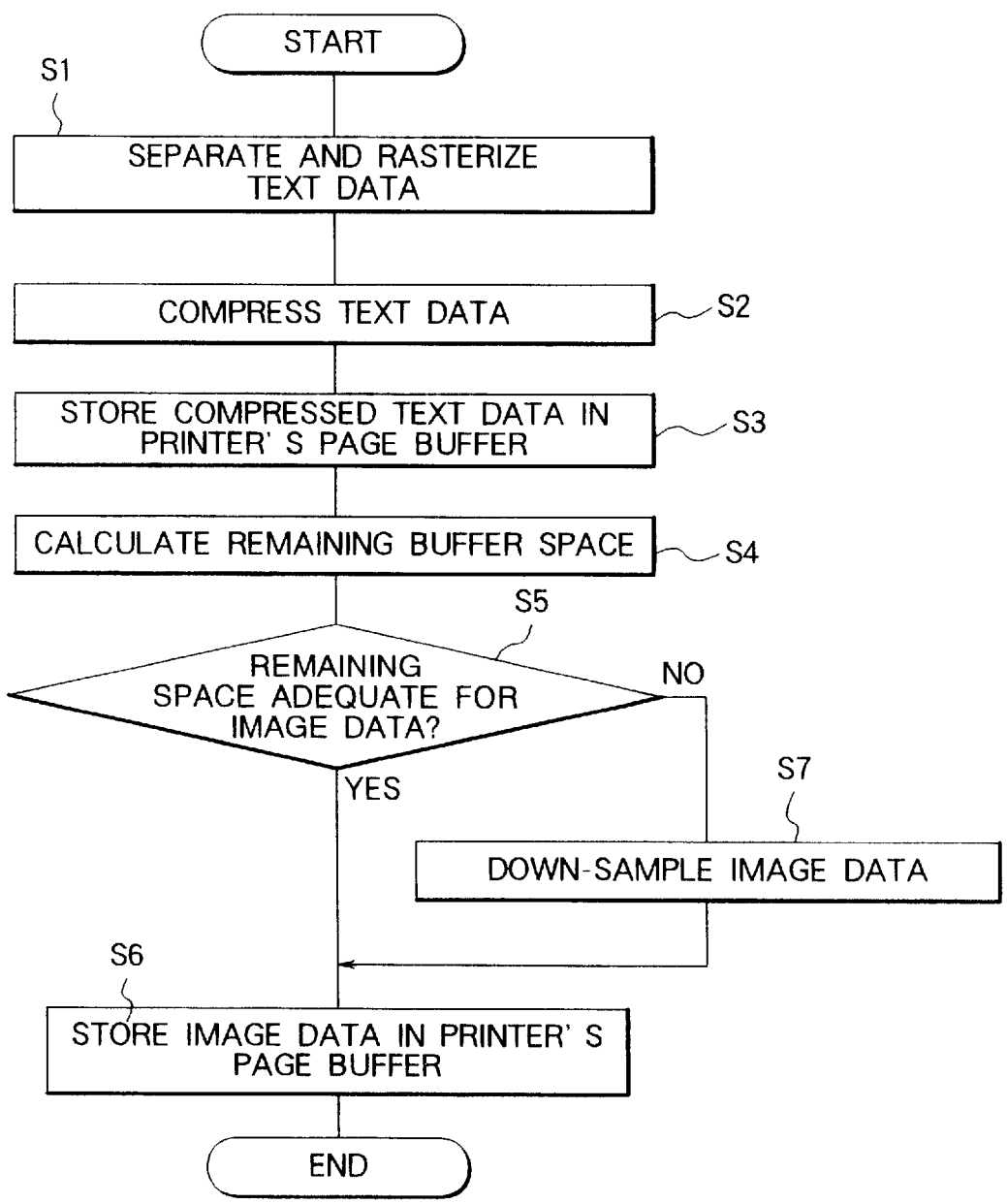
FIG. 3 is a flowchart illustrating the operation of the first embodiment.
Figure 4:
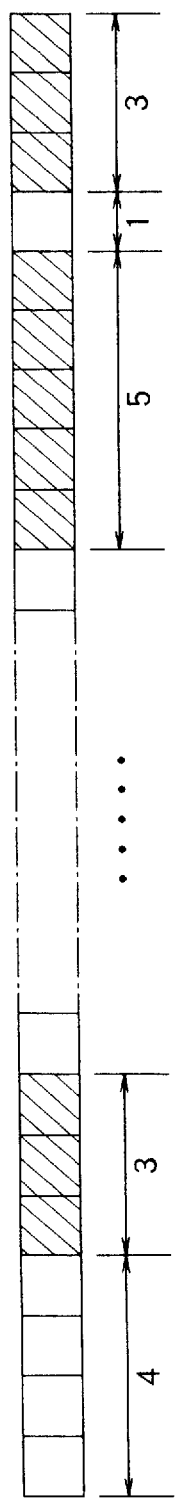
FIG. 4 illustrates run-length encoding of dot data.

Referring to FIG. 3, in step S1, by reading header information, the text/image separator 21 separates the text data from the image data and sends the text data to the rasterizer 22. The rasterizer 22 rasterizes the text data: that is, the rasterizer 22 converts the character codes of the text to dot-mapped text data, by reading the dot maps of the characters from a memory area not shown in the drawings. The dot-mapped text data are sent to the lossless data compressor 24.

In step S2, the lossless data compressor 24 compresses the dot-mapped text data by, for example, a run-length encoding method. FIG. 4 illustrates the basic run-length coding concept. The dot line in FIG. 4 starts with a run of four white dots, followed by a run of three black dots, and ends with a run of five black dots, followed by one white dot, then a run of three black dots. This dot line would be encoded by the numbers four, three, . . . , five, one, three. It is obvious that this type of compression enables the original dot data to be recovered completely.

There are many well-known run-length coding schemes. One preferred scheme is the modified modified-read (MMR) scheme used in group-four facsimile transmission, which employs variable-length codes to encode the lengths of the runs. The MMR scheme is two-dimensional: it also encodes vertical runs, by encoding the differences between each dot line and the preceding dot line.

In step S3 in FIG. 3, the compressed text data produced by the lossless data compressor 24 are transmitted to the printer 8 and stored in the page buffer 30. In addition, the lossless data compressor 24 notifies the control unit 26 of the size Mt of the compressed text data thus transmitted. The control unit 26 subtracts this size Mt from the known size Mp of the page buffer 30 to determine the remaining size Mr (step S4), and compares this remaining size Mr with the size Mi of the dot-mapped image data (step S5). Incidentally, when calculating the remaining space Mr, besides subtracting Mt, the control unit 26 subtracts an additional amount to leave room for image header information.

The size Mi of the dot-mapped image data is obtained from the image header information, which is supplied from the text/image separator 21 to the control unit 26. If W is the width of the dot-mapped image and H is the height, and if each dot value is expressed by one bit, then Mi is given in bytes by the following formula:

$$Mi=(H \times W)/8$$

If Mi is equal to or less than Mr, the down-sampler 28 transmits the unaltered dot-mapped image data to the printer 8, together with the image header information obtained from the text/image separator 21, adding a code to the image header to indicate that the down-sampling ratio is unity. The dot-mapped image data and image header information are stored in the remaining space in the page buffer 30.

If Mi is greater than Mr, the control unit 26 calculates a down-sampling ratio that will reduce the size of the image data to Mr or less. The down-sampling ratio is the least integer S satisfying the following inequality:

$$S > (Mi/Mr)^{1/2}$$

In step S7, the down-sampler 28 down-samples the dot-mapped image data, reducing the resolution of the data by a factor of S both vertically and horizontally. A simple method of down-sampling is decimation: the down-sampler 28 reads only every S-th dot line, and only every S-th dot in that dot line, discarding other dots and dot lines. Another method of down-sampling computes the total of the dot values in an S×S block of dots, divides this value by $S^2$, and outputs one dot with the resulting value, rounded off to the nearest integer. Either of these methods, or any other appropriate down-sampling method, may be employed.

After step S7, the down-sampler 28 sends the down-sampled image data to the printer 8, together with the image header information, adding information specifying the value of S (step S6). When transmission of the image data is completed, a signal indicating the end of the page is sent to the printer 8.

The printer 8 then reads the header information to determine where to place the text and image on the page, expands the compressed text data to recover an exact copy of the dot-mapped text data, and up-samples the image data, if the down-sampling ratio S is greater than unity, to restore the original resolution. A simple up-sampling method expands each dot of image data into an S×S block of dots having the same dot value. Other methods of up-sampling, such as linear interpolation, which produce a less blocky-looking output, are also possible. The data expansion and up-sampling processes can be carried out one horizontal dot line at a time.

Run-length encoding of dot-mapped text data is quite efficient, so if the page buffer 30 is reasonably large, the likelihood that the combined size of the compressed text data and image header will exceed the buffer size Mp is substantially nil. Moreover, as long as there is any remaining space in the page buffer 30, a down-sampling ratio that will compress the image data into that remaining space can be found from the inequality given above. The first embodiment is thus able, with substantially complete certainty, to avoid the problem of buffer overflow.

There is no degradation of the quality of the printed text, since lossless compression is used. Degradation of the printed image data may be noticeable when the down-sampling ratio is greater than unity, but for moderate down-sampling values, such image degradation is likely to be tolerable, as dot-mapped images are usually not expected to be perfectly sharp to begin with.

Figure 5:
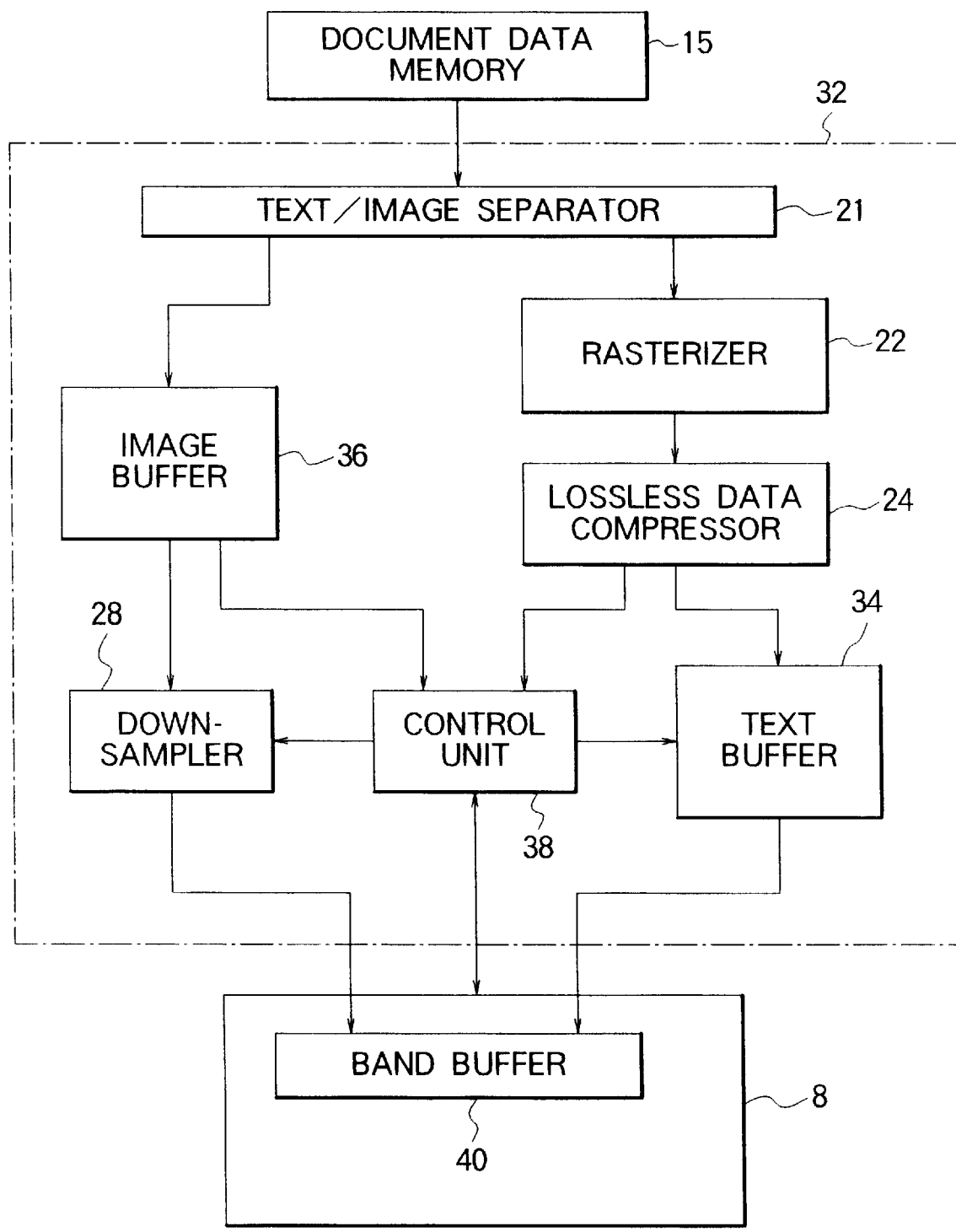
FIG. 5 is a functional block diagram of a second embodiment of the invented apparatus.

FIG. 5 shows a second embodiment, also illustrating the first aspect of the invention, using the same reference numerals as in FIG. 2 to indicate identical or equivalent elements. These include the text/image separator 21, rasterizer 22, lossless data compressor 24, and down-sampler 28, as well as the document data memory 15 and printer 8.

The data conversion system 32 of the second embodiment differs from that of the first embodiment in having a text buffer 34 for storing compressed text data, and an image buffer 36 for storing dot-mapped image data. The control unit 38 of the second embodiment communicates with the text buffer 34, image buffer 36, and printer 8, as well as with the lossless data compressor 24 and down-sampler 28.

The printer 8 to which the second embodiment is coupled differs from the printer in the first embodiment in having a band buffer 40 instead of a page buffer. A band buffer stores data for less than a full page. The printer 8 may be either a page printer or another type of printer. The size Mb of the band buffer 40 is known to the control unit 38.

Next the operation of the second embodiment will be described. The text/image separator 21, rasterizer 22, lossless data compressor 24, and down-sampler 28 operate as in the first embodiment, so the description will deal mainly with the operation of the control unit 38.

The second embodiment transmits data to the printer 8 in strips consisting of N dot lines at a time, where N is a fixed positive integer. For a printer that prints a fixed number of dot lines at once, N is that number of dot lines. For an ink-jet printer, for example, N is the number of nozzles in the ink-jet printing head. For a dot-matrix impact printer, N may be the number of dot-printing wires in the impact printing head.

For a page printer that can transfer a variable number of dot lines from the band buffer 40 to the print engine, it is convenient to set N equal to the size Mb of the band buffer 40 divided by the amount of data in one uncompressed dot line. If Mb is expressed in bytes, D is the number of dots per line, and each dot value is represented by one bit, then N can be set as follows:

$$N=(Mb \times 8)/D$$

Figure 6:
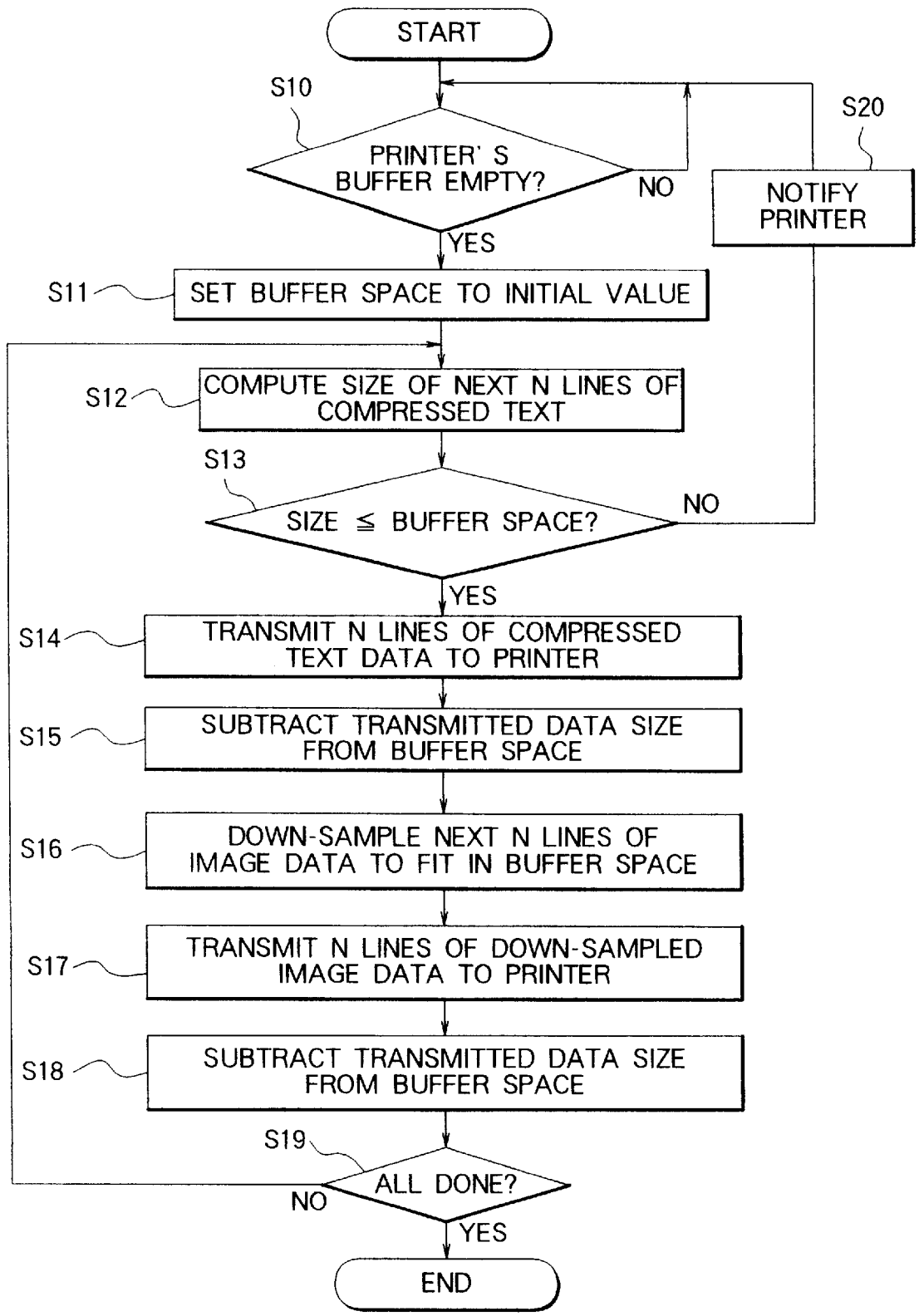
FIG. 6 is a flowchart illustrating the operation of the second embodiment.

Referring to the flowchart in FIG. 6, in step S10, the control unit 38 waits to receive a signal from the printer 8 indicating that the band buffer 40 is empty. While the control unit 38 is waiting, the text/image separator 21 separates a certain amount of data, equivalent to at least N dot lines, into text and dot-mapped image data, and places the dot-mapped image data and image header information in the image buffer 36. The rasterizer 22 rasterizes the text data to create dot-mapped text data, which the lossless data compressor 24 compresses and places in the text buffer 34, together with text header information. The lossless data compressor 24 notifies the control unit 38 of the compressed size of each dot line.

When a buffer-empty signal is received from the printer 8, the control unit 38 proceeds, in step S11, to initialize a variable Mr, indicating the remaining buffer space, by setting Mr equal to Mb.

In step S12, from the size information supplied by the lossless data compressor 24, the control unit 38 calculates the size Mt of the next N lines of compressed text data, including the size of any necessary text header and image header information. In step S13, this size Mt is compared with the remaining buffer size Mr. If Mt does not exceed Mr, the control unit 38 proceeds with steps S14 to S18.

In step S14, the control unit 38 causes the next N lines of compressed text data and their text header information (if any) to be transmitted from the text buffer 34 to the band buffer 40 in the printer 8. In step S15, the control unit 38 subtracts the size Mt of the transmitted text data and header, including the size of the yet-to-be transmitted image header, from the remaining buffer space Mr, and sets Mr equal to the resulting difference.

In step S16, the control unit 38 calculates the size Mi of the next N lines of dot-mapped image data, which is indicated by header information in the image buffer 36, compares this size Mi with the new value of Mr, and calculates a down-sampling ratio S by the formula given in the first embodiment. The down-sampler 28 down-samples these N lines of dot-mapped image data by the calculated down-sampling ratio S. If S is unity, the down-sampling process simply consists of placing a code indicating that S=1 in the image header information.

In step S17 these N lines of down-sampled image data and their header information are transmitted to the printer 8. In step S18 the control unit 38 subtracts the size Mi of the dot-mapped image data transmitted in step S17 from the remaining buffer size Mr, and sets Mr equal to the resulting difference.

In step S19, if all data in the document to be printed have been sent to the printer 8, the printing process ends. If not, the control unit 38 returns to step S12 and repeats the same process again, using the new value of Mr obtained in step S18. The control unit 38 continues to loop through steps S12 to S19 until either the end of the data is reached in step S19, or a negative result is obtained in step S13. Whenever the data in the text buffer 34 and image buffer 36 become depleted, the rasterizer 22 and lossless data compressor 24 rasterize and compress more text data, and the text/image separator 21 stores more dot-mapped image data in the image buffer 36.

When a negative result is obtained in step S13, indicating that there is not enough remaining space in the band buffer 40 to store the next N lines of compressed text data, in step S20 the control unit 38 notifies the printer 8 that transmission of one band of data to the band buffer 40 is complete, then returns to step S10. The printer 8 begins expanding, up-sampling, and printing the data in the band buffer 40, and notifies the control unit 38 when ready to receive another band of data.

The second embodiment leads to the same printed results as the first embodiment, except that different down-sampling ratios may be used in different parts of the same image. The resulting horizontally striped image appearance, while not in itself desirable, is preferable to having the printer halt in an error condition due to buffer overflow.

The advantage of the second embodiment is that it enables a page printer, or other printer, to print dot-mapped pages with a very limited amount of receive buffer space, without loss of text quality.

Figure 7:
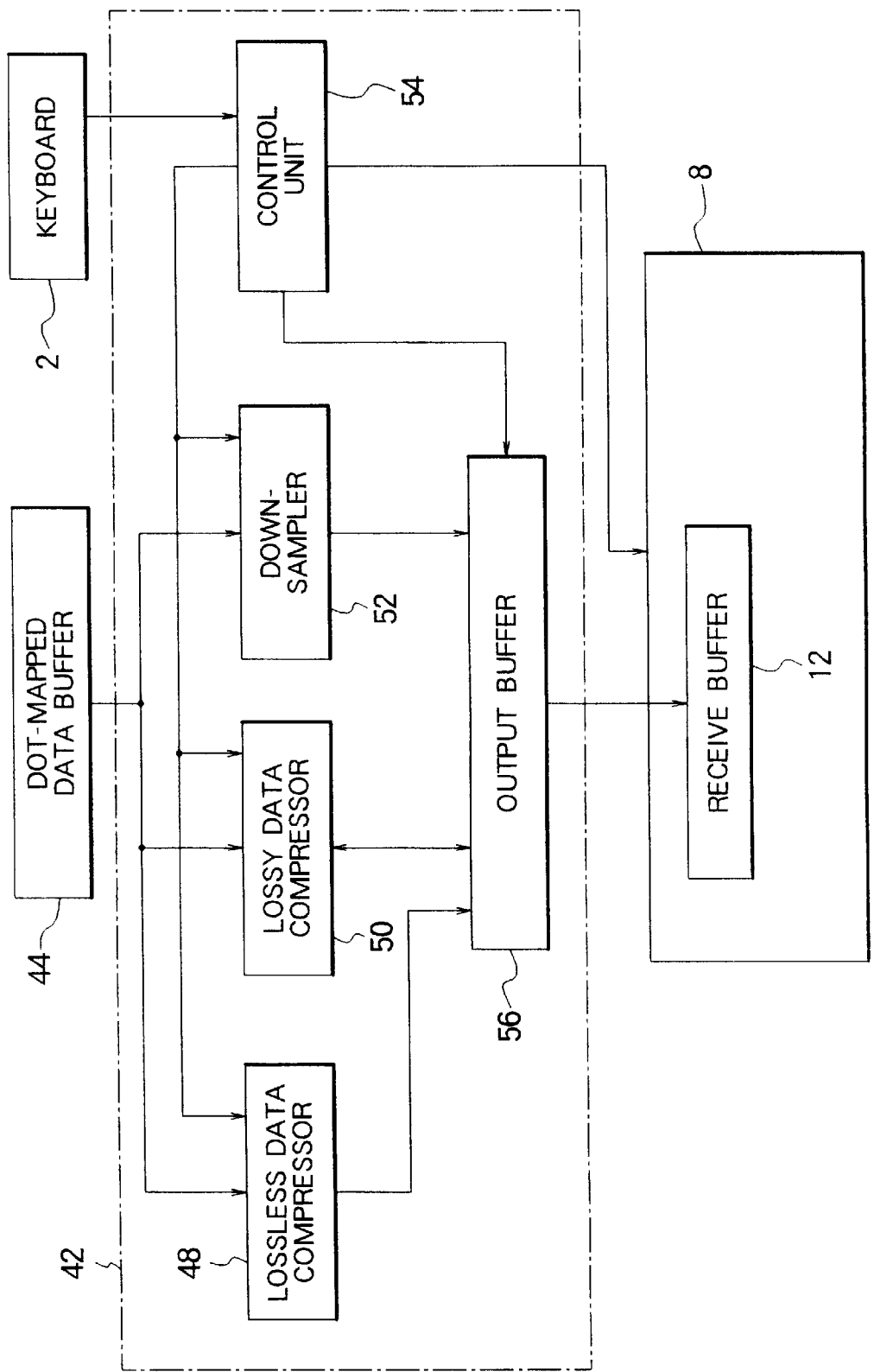
FIG. 7 is a functional block diagram of a third embodiment of the invented apparatus.

As a third embodiment, FIG. 7 shows a data compression apparatus 42 illustrating the second aspect of the invention. This apparatus 42 compresses arbitrary dot-mapped data to within a given size.

The dot-mapped data are stored in a dot-mapped data buffer 44, and can be supplied to a lossless data compressor 48, a lossy data compressor 50, and a down-sampler 52, which are controlled by a control unit 54. The compressed or down-sampled data produced by the lossless data compressor 48, lossy data compressor 50, or down-sampler 52 are stored in an output buffer 56, from which the data can be transmitted to a receive buffer 12 in a printer 8, again under control of the control unit 54. Down-sampled data stored in the output buffer 56 can also be read by the lossless data compressor 48 and lossy data compressor 50.

Next, automatic and semi-automatic modes of operation of the third embodiment will be described, with reference to the flowcharts in FIGS. 8 and 9. Both modes assume that the control unit 54 knows the size of the available space in the receive buffer 12, as a result, for example, of a signal received from the printer 8. In the semi-automatic mode of operation, the control unit 54 receives commands from a user at a keyboard 2.

Figure 8:
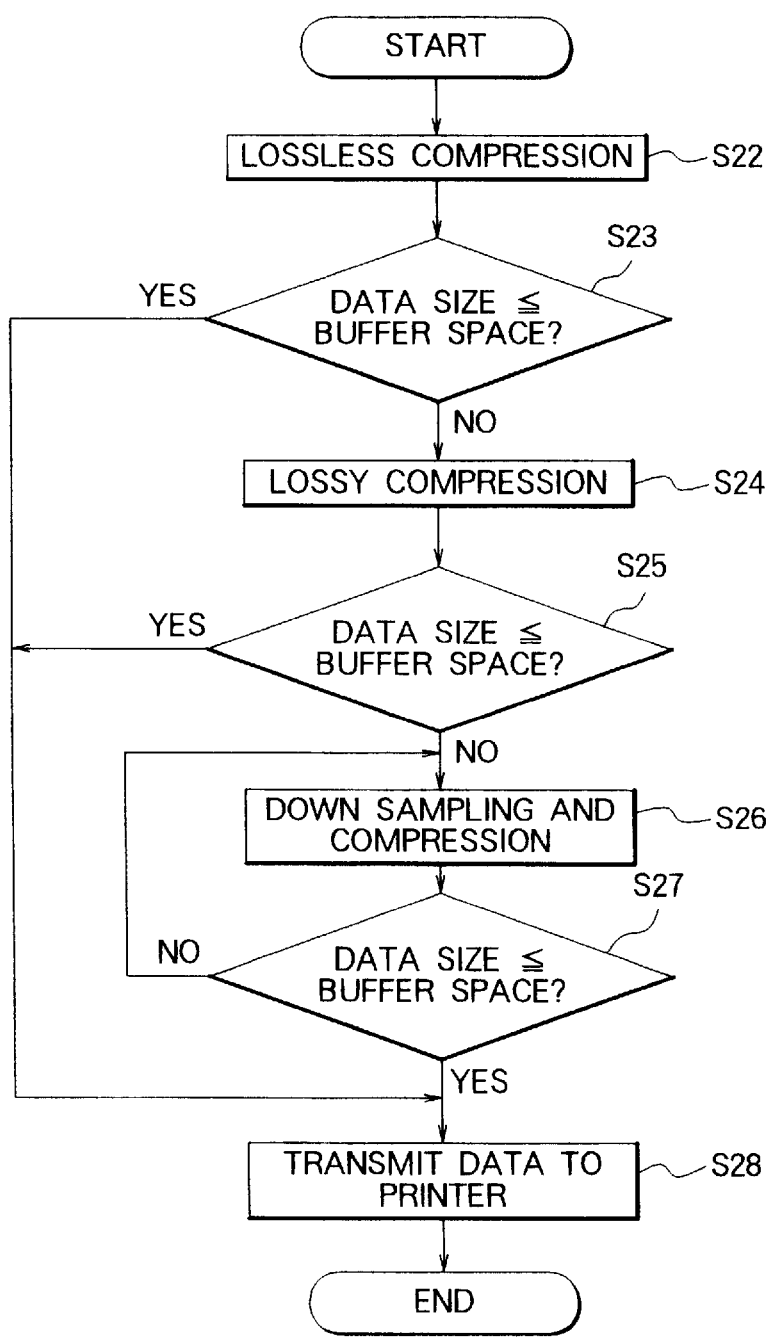
FIG. 8 is a flowchart illustrating one mode of operation of the third embodiment.

FIG. 8 illustrates the automatic mode. In step S22, the lossless data compressor 48 compresses the dot-mapped data by, for example, the MMR method, stores the resulting compressed data in the output buffer 56, and notifies the control unit 54 of the size of the compressed data. In step S23, the control unit 54 compares this size with the known amount of space available in the receive buffer 12. If the size of the losslessly compressed data exceeds the available amount of receive buffer space, the compressed data are deleted from the output buffer 56 and the control unit 54 proceeds to step S24.

In step S24, the same dot-mapped data are read again from the dot-mapped data buffer 44, and are compressed by the lossy data compressor 50. The lossy data compressor 50 preferably employs a perceptual compression method, meaning that while the expanded data will not be identical to the original data, the differences will not be readily perceived. The discrete cosine transform provides one well-known method of perceptual compression, as described in standards set by the Joint Photographic Experts Group (JPEG). Another known method comprises arithmetic coding preceded by minor modifications of the original data that improve the compression ratio. The lossy data compressor 50 stores the resulting compressed data in the output buffer 56, and notifies the control unit 54 of the size of the compressed data.

In step S25, the control unit 54 compares the size of the data as compressed by the lossy data compressor 50 with the receive buffer space. If the data size still exceeds the available receive buffer space, the control unit 54 again deletes the compressed data from the output buffer 56, and proceeds to step S26.

In step S26, the dot-mapped data are read yet again from the dot-mapped data buffer 44, and are down-sampled by the down-sampler 52, using a down-sampling ratio designated by the control unit 54. The down-sampled data are stored in the output buffer 56, then read and compressed by one of the two data compressors 48 and 50, as designated by the control unit 54. In step S27, the control unit 54 again compares the size of the resulting compressed data with the size of the receive buffer space.

If the compressed data size still exceeds the receive buffer space, the control unit 54 deletes the compressed data from the output buffer 56, returns to step S26, and has the down-sampling and compression process repeated, using either a higher down-sampling ratio, or a stronger form of compression, or both. A stronger form of compression may mean using the lossy data compressor 50 instead of the lossless data compressor 48, or may mean supplying the lossy data compressor 50 with parameters that designate a more lossy type of compression than before. With the discrete cosine transform, for example, successively higher compression ratios can be obtained by discarding successively more high-frequency information, or by quantizing the information more coarsely. Steps S26 and S27 are repeated until the compressed data are small enough to fit into the available space in the receive buffer 12.

When the control unit 54 finds in step S23, S25, or S27 that the compressed data size is equal to or less than the size of the buffer space, the compressed data are transmitted from the output buffer 56 to the receive buffer 12 in the printer 8 (step S28), and the compression process ends.

Figure 9:
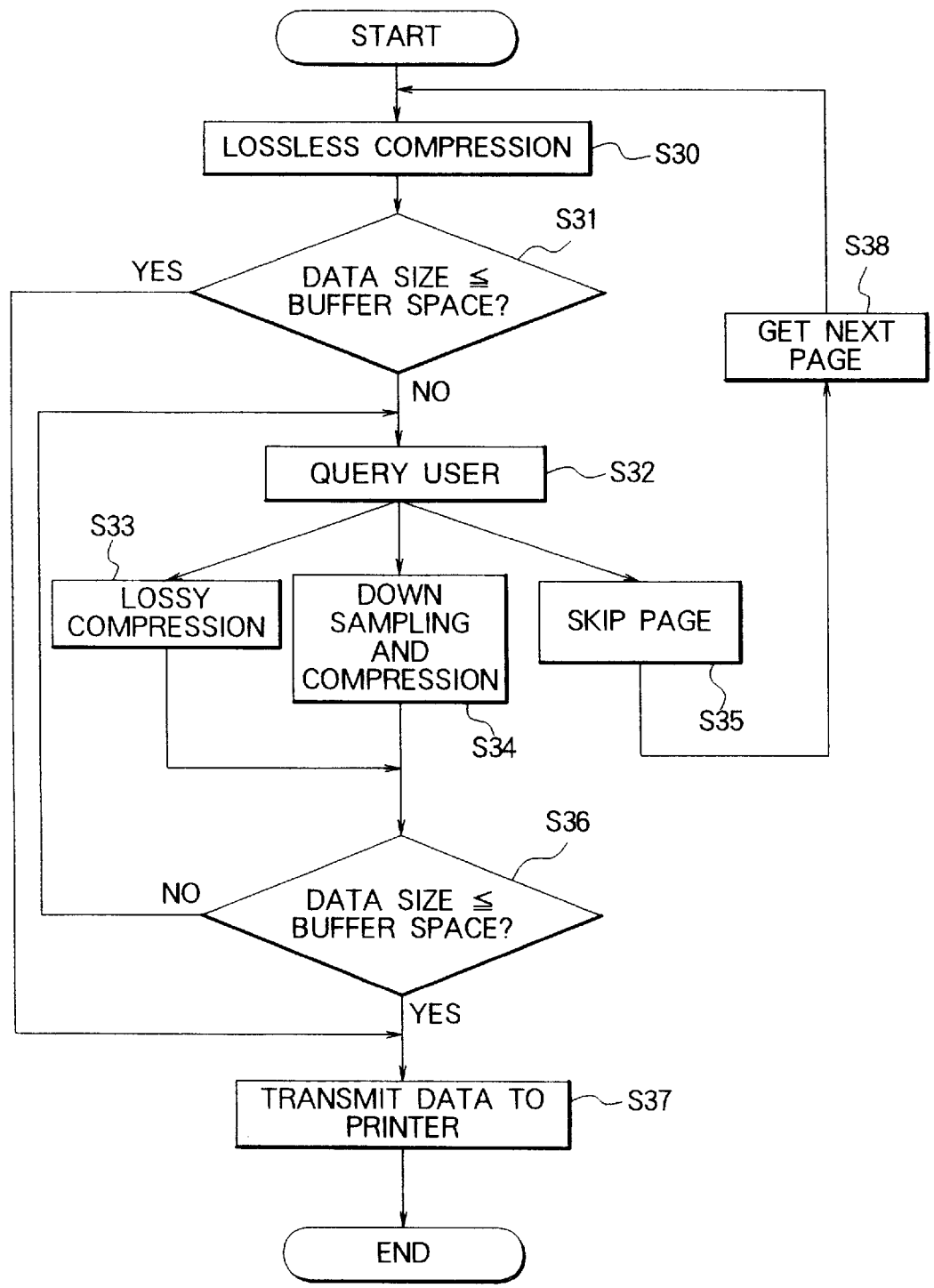
FIG. 9 is a flowchart illustrating another mode of operation of the third embodiment.

FIG. 9 illustrates a semi-automatic mode of operation of the third embodiment.

Steps S30 and S31 are the same as steps S22 and S23 in FIG. 8: lossless compression is carried out, and if the compressed data fit within the given buffer space, the data are sent to the printer 8.

If lossless compression is insufficient, in step S32 the control unit 54 notifies the human user and requests instructions. The user replies by entering a command from the keyboard 2, selecting one of steps S33, S34, and S35. Step S33 is a lossy compression step equivalent to step S24 in FIG. 8. Step S34 is a down-sampling-and-compression step equivalent to step S26 in FIG. 8. Step S35 consists in skipping the current page.

If step S33 or step S34 is requested, the designated compression process is carried out, and the size of the resulting compressed data is compared with the receive buffer size in step S36. If the compressed data now fit within the given buffer space, the data are sent to the printer 8. Otherwise, the control unit 54 returns to step S32 and queries the user again. If the user selects the same type of compression again, the compression process is repeated with stronger compression parameters.

If step S35 is requested, the control unit 54 sends the printer 8 a signal instructing the printer 8 to cancel the current page and clear its receive buffer 12. This page is not printed. In step S38, data for the next page are read from the dot-mapped data buffer 44, and the process returns to step S30.

The semi-automatic mode of operation has the advantage of avoiding the printing of pages in which the dot-mapped data would be distorted to an unacceptable degree by a lossy compression process, or by down-sampling.

Like the first two embodiments, the third embodiment can compress dot-mapped data to an arbitrary size, by using an appropriate down-sampling ratio. The data compression apparatus 42 of the third embodiment can therefore be substituted for the down-sampler 28 in the first two embodiments. This substitution avoids needless loss of image quality when image data can be sufficiently compressed by lossless or lossy data compression, without resort to the more drastic step of down-sampling. Even when down-sampling is necessary, the third embodiment can improve image quality by also performing a compression process on the down-sampled data, thereby permitting a smaller down-sampling ratio to be employed.

The third embodiment can also be used independently, to compress an entire page of dot-mapped data, i.e., including text data as well as image data.

As a variation of the third embodiment, when lossless compression alone is inadequate, the original data can be recovered by expanding the losslessly compressed data, instead of reading the data again from the dot-mapped data buffer 44. In this case the losslessly compressed data are discarded after expansion.

As another variation, instead of waiting for a compression step to be completed before comparing the size of the compressed data with the buffer size, the control unit 54 can monitor the size of the compressed data on a line-by-line basis, and terminate the compression process as soon as the amount of compressed data exceeds the receive buffer size, thereby speeding up the transition to the next compression process.

Figure 10:
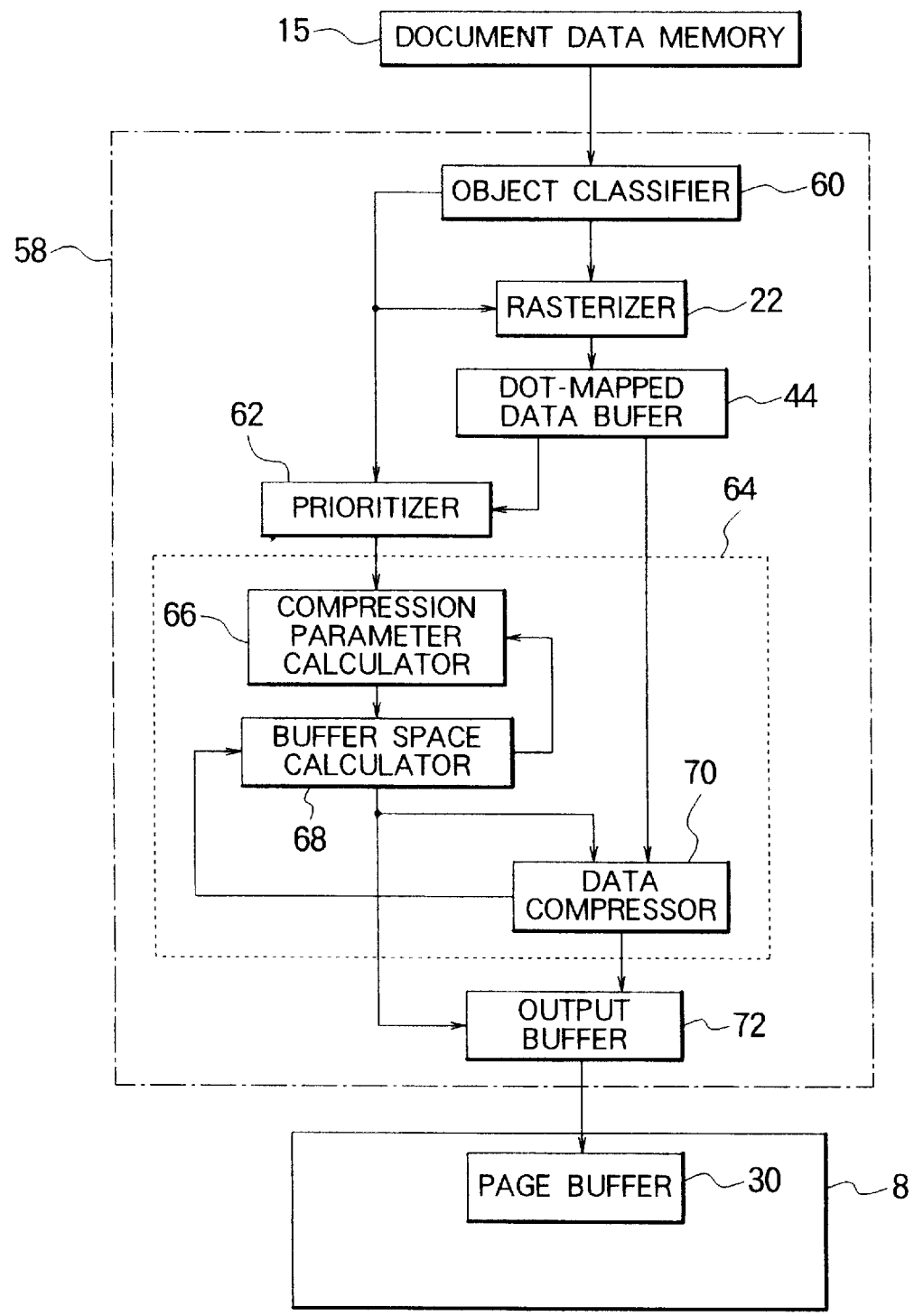
FIG. 10 is a functional block diagram of a fourth embodiment of the invented apparatus.

FIG. 10 shows a fourth embodiment, illustrating the third aspect of the invention. The connected printer 8 is a page printer with a page buffer 30. The document data stored in the document data memory 15 now comprise objects of various types, not necessarily limited to text and dot-mapped images. For example, some objects may be line graphics objects described by graphics drawing commands.

The data conversion system 58 of the fourth embodiment comprises a rasterizer 22 as in the first two embodiments, a dot-mapped data buffer 44 as in the third embodiment, an object classifier 60, a prioritizer 62, and a compression unit 64. The compression unit 64 comprises a compression parameter calculator 66, a buffer space calculator 68, and a data compressor 70. The data compressor 70 is capable of carrying out different compression methods with different compression ratios, preferably including at least one lossless compression method, and a lossy method with a parameter-controllable compression ratio. These elements are interconnected as shown in the drawing. The compressed data produced by the data compressor 70 are stored in an output buffer 72, then transmitted to the printer 8.

Figure 11:
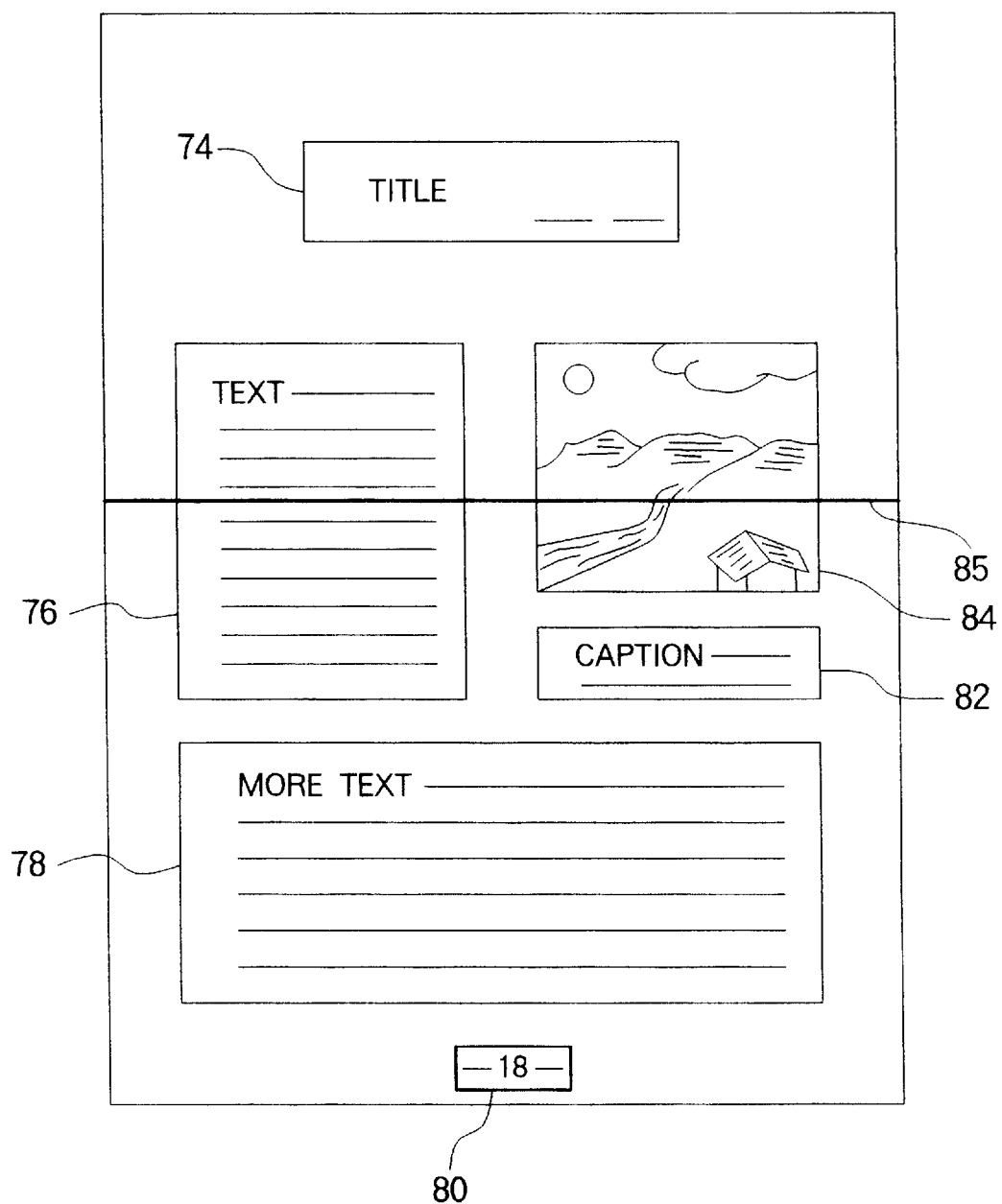
FIG. 11 illustrates a page with text and images objects.

FIG. 11 shows an example of a page with several objects, including a title object 74, two blocks of text 76 and 78, a page-number object 80, another block of text 82, and a dot-mapped image object 84. In the document memory 15, each object has a header describing its position on the page, and such other attributes as font name, character size, or image height and width.

Next the operation of the fourth embodiment will be described, with reference to the flowchart in FIGS. 12 and 13.

Figure 12:
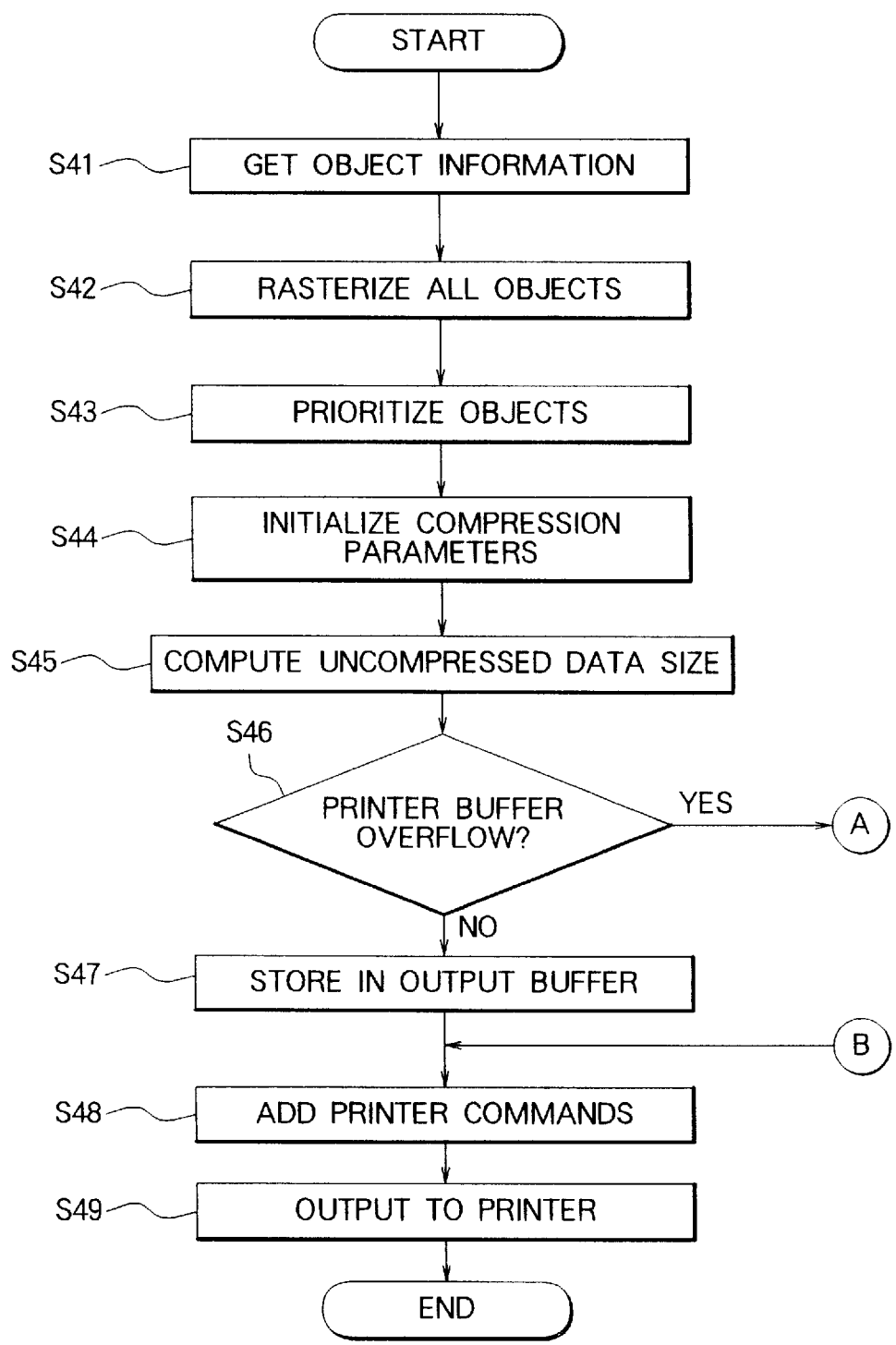
FIGS. 12 and 13 are a flowchart illustrating the operation of the fourth embodiment.

Referring to FIG. 12, in step S41, the object classifier 60 reads the headers of all the objects on one page and classifies the objects according to type. The classifications are passed to the rasterizer 22 and prioritizer 62.

In step S42, the rasterizer 22 rasterizes those objects that are not already in dot-mapped data form. Text data are rasterized as described in the first embodiment. Line graphics are rasterized by executing graphics drawing commands. If necessary, the rasterizer 22 also converts dot-mapped image data so that the number of bits per dot matches the capability of the printer 8. If the printer 8 prints only black and white dots (one bit per dot), for example, and if the dot-mapped image data have a gray scale with more than one bit per dot, the rasterizer 22 converts the dot data to black-and-white data by a well-known process such as dithering or error diffusion. The rasterized objects are stored in the dot-mapped data buffer 44, together with header information giving the height and width of each object and its location on the page.

In step S43 the prioritizer 62 assigns priorities to the objects according to their type as determined by the object classifier 60, and their size as given by the header information of the dot-mapped data. The prioritization rule may vary depending on the kind of document being printed. As one example, for a document that is primarily a text document, text objects may be given highest priority, and dot-mapped image objects such as object 84 in FIG. 11 may be given the lowest priority. Among objects of the same type, larger objects are given higher priority than smaller objects. For a document that is essentially a collection of scanned photographs, dot-mapped image data might be given the highest priority. Objects having the same type and size are prioritized in an arbitrary order, so that each object has a unique priority. The priority information, and the object size information, is supplied to the compression unit 64.

In step S44, the compression parameter calculator 66 initializes the compression parameters of each object to a value indicating that no compression is to be performed. In step S45, the compression parameter calculator 66 computes the total size of the dot-mapped data and header information of all the uncompressed objects. In step S45, the compression parameter calculator 66 compares this total size with the known size of the printer's page buffer 30. If the total size of the uncompressed objects does not exceed the buffer size, in step S47 the uncompressed objects are stored directly in the output buffer 72. Printer commands are added as necessary to the object data in step S48, and the uncompressed object data are transmitted to the printer's page buffer 30 in step S49.

Figure 13:
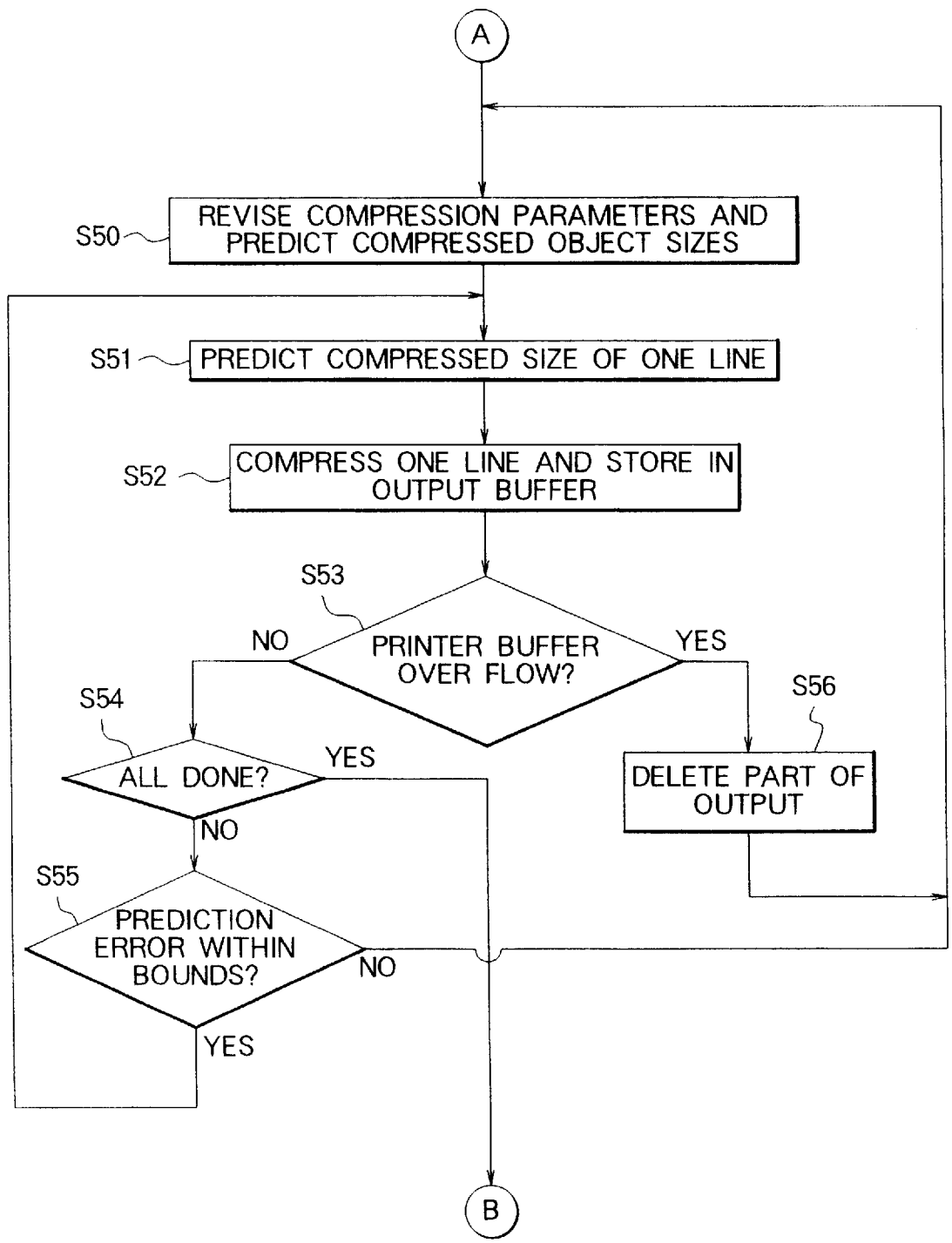

If the total size of the uncompressed objects exceeds the printer's buffer size, the process branches from step S46 to step S50 in FIG. 13. In step S50 the compression parameter calculator 66 revises the compression parameters and predicts the resulting size to which each object will be compressed. The compression parameters are determined on the basis of the object priorities.

As one example of the procedure followed in step S50, first lossless compression is designated for each object in turn, working from the lowest-priority object toward the highest-priority object, and stopping if the total predicted size of the objects becomes equal to or less than the printer's buffer size. If the predicted result of lossless compression of all the objects is larger than the buffer size, next the compression parameters are changed from lossless to lossy compression, again working from low-priority to high-priority objects. The lossy compression parameters are preferably set so that low-priority objects are compressed more than high-priority objects. Adjustment of the compression parameters continues until the total predicted size of the compressed objects is within the printer's buffer size.

The next steps S51 to S55 form a loop that is repeated once for each dot line on the page, starting from the top of the page.

In step S51, the compression parameter calculator 66 predicts the compressed size of one dot line on the page, from the predicted compression ratios of the objects occurring in that line, and notifies the buffer space calculator 68 of the predicted size.

In step S53, the data compressor 70 compresses that dot line, using the designated compression parameters. The data compressor 70 stores the resulting compressed data in the output buffer 72, and notifies the buffer space calculator 68 of the size of the compressed line of data.

Referring again to FIG. 11, if the compression parameter calculator 66 has designated lossless compression for object 76 and lossy compression for object 84, then dot line 85, for example, is compressed into two parts: one part containing the losslessly compressed dot data pertaining to object 76, and one containing lossy compressed data pertaining to object 84. Information designating the coding method, the widths of objects 76 and 84, and the positions of these objects is also coded as necessary. If the lossy coding method is based on N×N blocks of dot data for an integer N greater than one, then lossy compressed data will appear only once every N dot lines.

The buffer space calculator 68 maintains a cumulative total of the predicted sizes of the compressed dot lines, as reported from the compression parameter calculator 66, and a cumulative total of the actual sizes, as reported from the data compressor 70. After each line has been stored in the output buffer 72, in step S53, the buffer space calculator 68 checks whether the total amount of compressed data stored so far in the output buffer 72 exceeds the size of the printer's page buffer 30. If it does not, the process proceeds to step S54.

If the line just stored in the output buffer 72 was the last line on the page, the process returns from step S54 to step S48 in FIG. 12, to add printer commands and transmit the compressed data from the output buffer 72 to the printer 8.

If the line just compressed and stored was not the last line on the page, in step S55 the actual and predicted cumulative data-size totals maintained by the buffer space calculator 68 are compared to determine the cumulative prediction error, and the prediction error is compared with predetermined positive and negative bounds. If the prediction error exceeds the negative bound, meaning that the actual total data size exceeds the predicted total data size by more than a certain amount, the process returns to step S50, and the compression parameters for the remaining lines on the page are readjusted to increase the compression ratio. If the prediction error exceeds the positive bound, meaning that the predicted total data size exceeds the actual total data size by more than a certain amount, the process also returns to step S50, and the compression parameters for the remaining lines are adjusted to reduce the compression ratio and obtain better image quality. If the prediction error is within the negative and positive bounds, the process returns to step S51 to process the next dot line without readjustment of the compression parameters.

If in step S53 it is found that the cumulative total size of the data stored so far in the output buffer 72 exceeds the available page buffer space, then in step S56 at least part of the data is deleted from the output buffer 72, and the process returns to step S50. Here the compression parameters are revised to increase the compression ratio, and the compression loop from step S51 to step S55 is repeated, starting from the first deleted line. The number of lines deleted depends on the number of lines left on the page. If necessary, all lines processed so far can be deleted from the output buffer 72, and the compression process can restart from the top of the page.

The fourth embodiment has the advantage of being able to compress a variety of types of objects to sufficiently small sizes without unnecessary over-compression, and the further advantage of compressing the most important objects by the compression methods that cause least loss of printed quality. By predicting the size of the compressed data, monitoring the actual compressed size, and adjusting the compression parameters as necessary, the fourth embodiment can usually achieve successful compression on the first try, without having to compress the same data repeatedly, which is a still further advantage.

As a variation of the fourth embodiment, the buffer space calculator 68 can notify the compression parameter calculator 66 only when the actual compressed data size exceeds the predicted size by the above-mentioned certain amount, and not when the predicted size exceeds the actual size, in order to minimize changes in the compression parameters.

Figure 14:
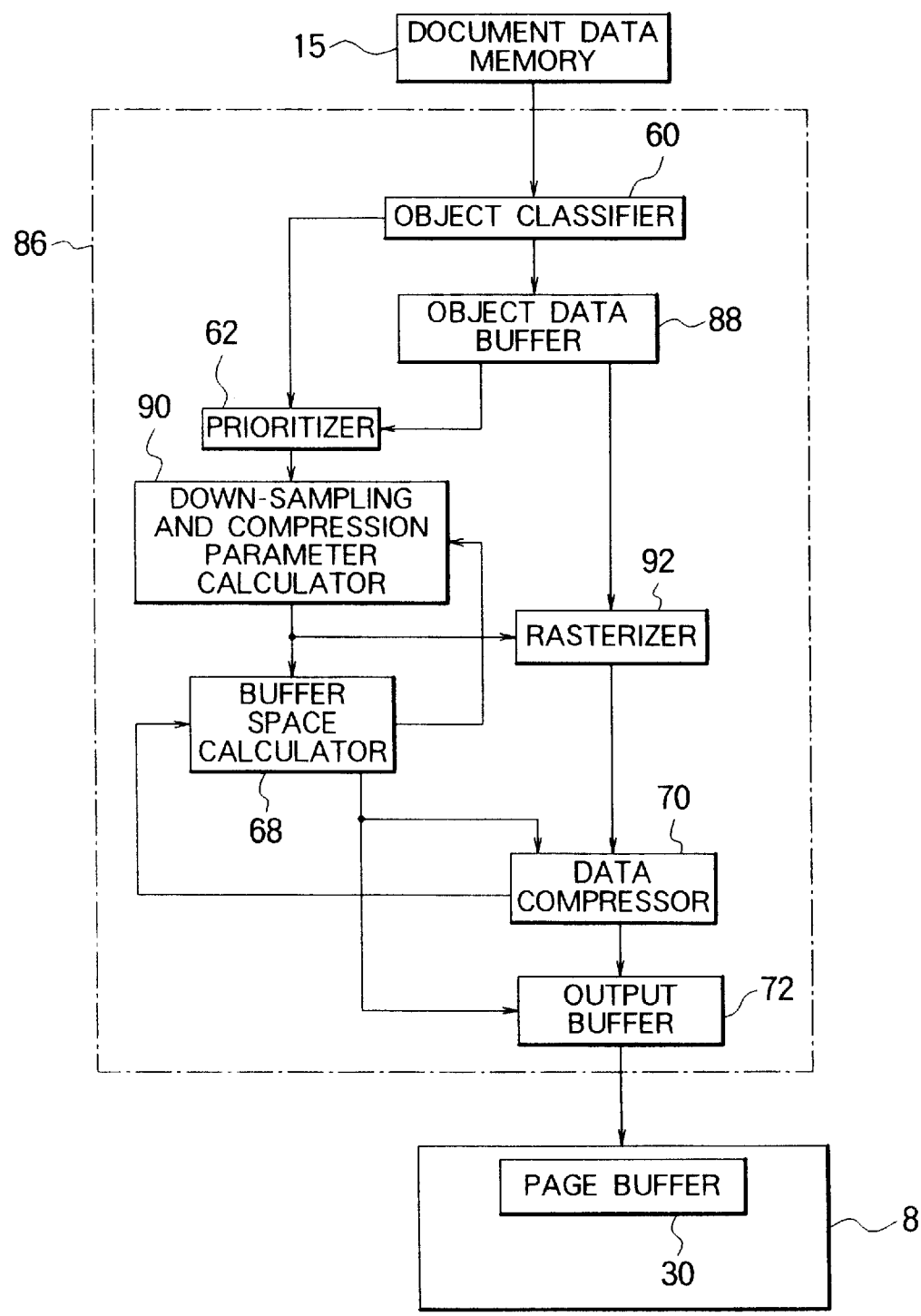
FIG. 14 is a functional block diagram of a fifth embodiment of the invented apparatus.

FIG. 14 shows a fifth embodiment, illustrating the third aspect of the invention, and using the same reference numerals as in FIG. 10 for equivalent elements. These include the document data memory 15, the printer 8 and its page buffer 30, the object classifier 60, the prioritizer 62, the buffer space calculator 68, the data compressor 70, and the output buffer 72.

In place of the dot-mapped data buffer of the fourth embodiment, the data conversion system 86 of the fifth embodiment has an object data buffer 88 that stores the original object data received from the document data memory 15, under control of the object classifier 60. The down-sampling and compression parameter calculator 90 is similar to the compression parameter calculator of the fourth embodiment, but calculates both compression and down-sampling parameters. The rasterizer 92 has both the rasterizing functions described in the fourth embodiment and a down-sampling function.

Next the operation of the fifth embodiment will be described with reference to the flowchart in FIGS. 15 and 16. The fifth embodiment processes one page at a time, but differs from the fourth embodiment in compressing one object at a time, instead of one dot line at a time.

Figure 15:
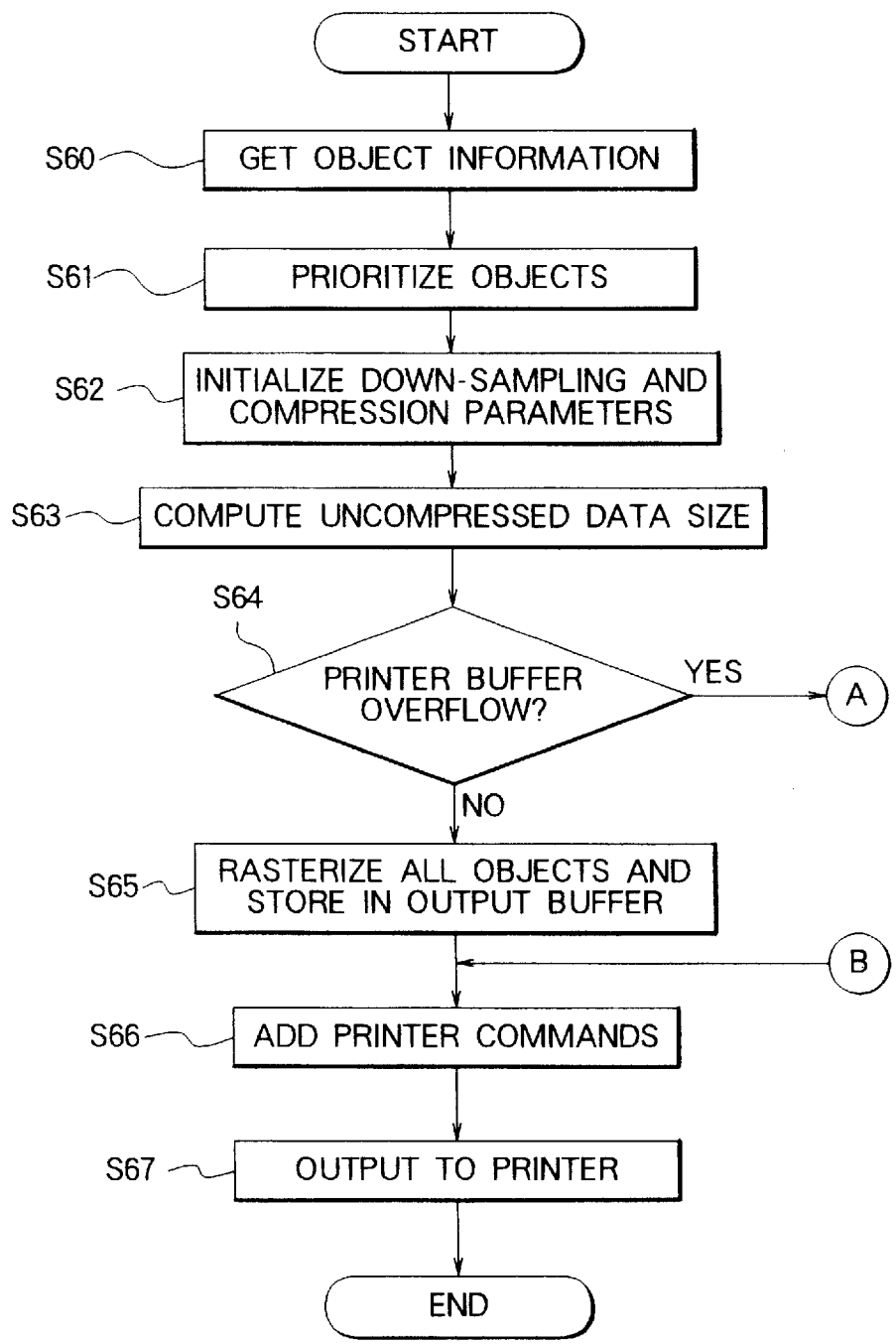
FIGS. 15 and 16 are a flowchart illustrating the operation of the fifth embodiment.

Steps S60 and S61 in FIG. 15 are the same as steps S41 and S43 in FIG. 12: the object classifier 60 reads the header information about each object on the page, and the prioritizer 62 assigns each object a unique priority.

In step S62, the down-sampling and compression parameter calculator 90 initializes both compression and down-sampling parameters to a value designating no down-sampling and no compression. In step S63 the down-sampling and compression parameter calculator 90 computes the size that each object will have after rasterization. This computation can be performed accurately because no data compression is involved. In step S64, the total computed size of the objects is compared with the size of the printer's page buffer 30. If the total size does not exceed the buffer size, the objects are rasterized without down-sampling by the rasterizer 92 in step S65, then printer commands are added in step S66 and the object data are output to the printer in step S67.

Figure 16:
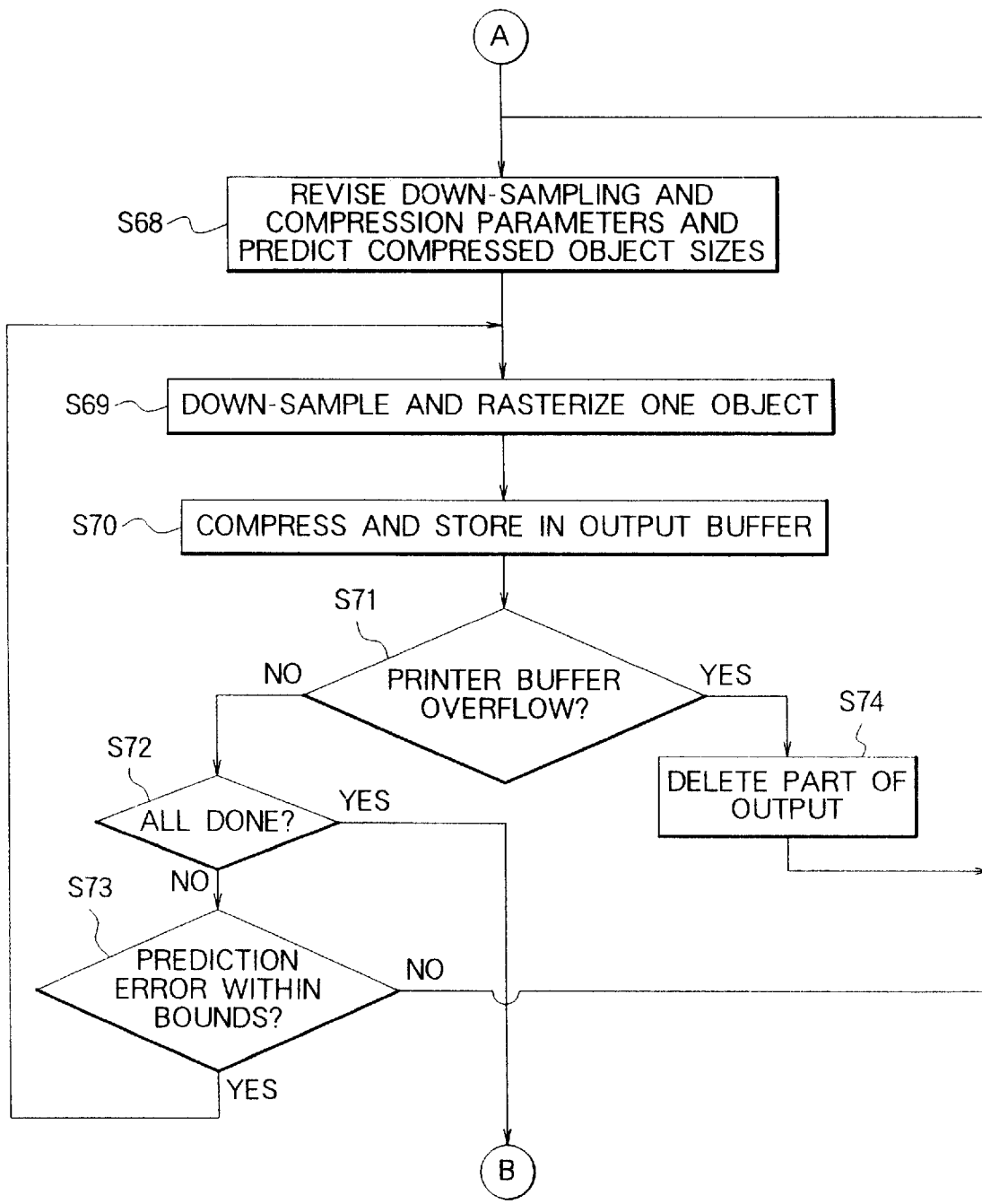

If the total size computed in step S63 exceeds the printer's buffer size, processing branches from step S64 to step S68 in FIG. 16. Step S68 is similar to step S50 in FIG. 13, except that in addition to revising the compression parameters, if necessary, the down-sampling and compression parameter calculator 90 can designate a down-sampling ratio greater than unity. In assigning down-sampling ratios, the down-sampling and compression parameter calculator 90 follows a priority rule so that the down-sampling ratio of a higher-priority object never exceeds the down-sampling ratio of a lower-priority object. The down-sampling and compression parameter calculator 90 also predicts the size that each object will have after rasterization, down-sampling, and compression.

Steps S69 to S73 form a loop that is carried out one object at a time, in order from the highest-priority object to the lowest-priority object.

In step S69, the rasterizer 92 rasterizes and down-samples one object, using the down-sampling ratio designated by the down-sampling and compression parameter calculator 90. If the down-sampling ratio is unity, then no down-sampling is performed. The resulting dot-mapped data are output to the data compressor 70.

In step 70, the data compressor 70 compresses the dot-mapped data of the object according to the designated compression parameters, and notifies the buffer space calculator 68 of the compressed size of the object. The compressed object data are placed in the output buffer 72, together with object header information. Codes indicating the compression method and down-sampling ratio are added to the header information.

In step S71, the buffer space calculator 68 compares the cumulative total size of the compressed object data stored in the output buffer 72 so far with the size of the printer's page buffer 30. If the compressed data size does not exceed the buffer size, a decision is made in step S72 as to whether the object just compressed was the last object on the page. If so, the process returns to step S66 in FIG. 15 to add printer commands and transmit the data to the printer 8.

If the current object was not the last object, in step S73 the buffer space calculator 68 compares the actual and predicted cumulative total sizes of the compressed object data stored in the output buffer 72 so far to determine the prediction error, and compares the prediction error with positive and negative bounds as in the fourth embodiment. If the prediction error is within the bounds, processing returns to step S69 to rasterize and compress the next object. Otherwise, processing returns to step S68 to revise the compression parameters and/or down-sampling ratios that will be employed for the remaining objects.

If the cumulative size of the data stored in the output buffer 72 exceeds the printer's buffer size, processing branches from step S71 to step S74, in which the object just rasterized and compressed is deleted from the output buffer 72. If necessary, one or more preceding objects can also be deleted. The process then returns to step S68, to revise the compression and/or down-sampling parameters of the deleted objects and other remaining objects, after which these objects are rasterized and compressed again.

The fifth embodiment has the same advantages as the fourth embodiment, with two further advantages. One is that each object is rasterized and compressed with a uniform set of parameters. Another is that down-sampling can be used to reduce the size of dot-mapped image data. When a substantial reduction in the size of dot-mapped image data is necessary, down-sampling has the advantage of giving accurately predictable results, and of avoiding the distortion sometimes caused by lossy compression methods with high compression ratios.

As a variation of the fifth embodiment, the size of the compressed data can be tested at intermediate stages of the compression of each object, e.g. at every N-th dot line for some positive integer N, to detect buffer overflow more quickly.

Although the fourth and fifth embodiments were described as setting compression parameters for each object, that does not preclude the use of a compression method that tests each dot line in an object and selects a compression method suitable for the properties of that dot line.

Down-sampling in the preceding embodiments was described as being performed two-dimensionally, but one-dimensional down-sampling is also possible. For example, the amount of dot-mapped image data can be reduced by a factor of two by deleting every second dot line in the image.

Those skilled in the art will recognize that further modifications are possible within the scope claimed below.

What is claimed is:

1. A method of compressing data of mixed types having different priority levels to within a given size, comprising the steps of:

separating said data of mixed types into data of a first type and data of a second type, the data of said first type having a higher priority than the data of said second type;

compressing the data of said first type using a first compression method, producing compressed data of said first type;

storing the compressed data of said first type in a memory area having said given size;

calculating a remaining size of said memory area by subtracting a size of the compressed data of said first type from said given size;

selecting a second compression method having a compression ratio not less than a ratio of a size of the data of said second type to said remaining size;

compressing the data of said second type using said second compression method, producing compressed data of said second type; and storing the compressed data of said second type in said memory area.

2. The method of claim 1, wherein said compression ratio is unity if the size of the data of said second type does not exceed said remaining size.

3. The method of claim 1, comprising the further step of transmitting the compressed data of said first type and the compressed data of said second type from said memory area to a printer having a page buffer of said given size.

4. The method of claim 1, wherein said method is carried out on successive strips of the data of mixed types, comprising the further step of:

updating said given size by subtracting a size of said compressed data of said second type from said remaining size.

5. The method of claim 1, wherein said step of compressing the data of said second type further comprises the steps of:

compressing the data of said second type using a lossless compression method, thereby producing first compressed data of said second type; and compressing the data of said second type using a lossy compression method, thereby producing second compressed data of said second type, if said first compressed data of said second type have a size exceeding said remaining size.

6. An apparatus for compressing data of mixed types having different priority levels to within a given size, comprising:

a data separator for separating said data of mixed types into data of a first type and data of a second type, the data of said first type having a higher priority than the data of said second type;

a first data compressor for compressing the data of said first type using a first compression method, producing compressed data of said first type;

a control unit coupled to said first data compressor, for calculating a remaining size by subtracting a size of the compressed data of said first type from said given size, then calculating a compression ratio by comparing a size of the data of said second type with said remaining size; and a second data compressor for compressing the data of said second type according to said compression ratio, producing compressed data of said second type.

7. The apparatus of claim 6, wherein said compression ratio is unity if a size of the data of said second type does not exceed said remaining size.

8. The apparatus of claim 6, further comprising:

a first buffer coupled to said first data compressor, for storing said compressed data of said first type; and a second buffer coupled to said data separator, for storing said data of said second type prior to compression by said second data compressor.

9. The apparatus of claim 8, wherein said control unit also subtracts a size of said compressed data of said second type from said remaining size, and uses a resulting difference as an updated given size for use in compressing further data of said first type and further data of said second type.

10. A method of compressing dot-mapped data to within a given size, comprising the steps of:

compressing said dot-mapped data using a first compression method, thereby producing first compressed data according to a first compression ratio;

comparing a size of said first compressed data with said given size;

compressing said dot-mapped data using a second compression method having a second compression ratio which is greater than said first compression ratio, thereby producing second compressed data, if the size of said first compressed data exceeds said given size;

comparing a size of said second compressed data with said given size; and compressing said dot-mapped data using a third compression method having a third compression ratio which is greater than said second compression ratio, said third compression method including at least a reduction of resolution, thereby producing third compressed data, if the size of said second compressed data exceeds said given size.

11. The method of claim 10, wherein said third compression method also includes compression using a method selected from between said first compression method and said second compression method, following said reduction of resolution.

12. The method of claim 10, wherein said dot-mapped data constitute one page of data to be transmitted to a printer.

13. The method of claim 12, comprising the further steps of:

notifying a human user if the size of said first compressed data exceeds said given size;

proceeding to said step of compressing said dot-mapped data using a second compression method, responsive to a first command from said human user;

proceeding directly to said step of compressing said dot-mapped data using a third compression method, bypassing said step of compressing said dot-mapped data by a second compression method, responsive to a second command from said human user; and skipping transmission of said one page of data, responsive to a third command from said human user.

14. An apparatus for compressing dot-mapped data to within a given size, for transmission of the compressed data from a computing device to a peripheral device, comprising:

first compression means, disposed in said computing device, for compressing said dot-mapped data to produce first compressed data according to a first compression ratio;

second compression means, disposed in said computing device, for compressing said dot-mapped data to produce second compressed data according to a second compression ratio which is greater than the first compression ratio;

resolution-reducing means, disposed in said computing device, for reducing a resolution of said dot-mapped data by a specifiable ratio; and a control unit coupled to said first compression means and said second compression means, for selecting said first compressed data if said first compressed data have a size not exceeding said given size, for selecting said second compressed data if said first compressed data have a size exceeding said given size and said second compressed data have a size not exceeding said given size, and for directing said resolution-reducing means to reduce said dot-mapped data, then selecting one compression means from between said first compression means and said second compression means and directing the selected compression means to compress the dot-mapped data as reduced by said resolution-reducing means, if both said first compressed data and said second compressed data have sizes exceeding said given size.

15. The apparatus of claim 14, wherein said first compression means is a lossless compression means, and said second compression means is a lossy compression means.

16. The apparatus of claim 14, wherein said control unit notifies a human user when a selected one of said first compression means and said second compression means fails to compress said dot-mapped data to within said given size.

17. The apparatus of claim 16, wherein said control unit selects different compression means from between said first compression means and said second compression means and decides whether to use said resolution-reducing means, responsive to commands from said human user.

18. A method of compressing data describing a group of objects forming a page of a documents to within a given size for transmission from a computing device to a peripheral device, comprising the steps of:

dividing said data into object data describing individual objects of different types on said page;

classifying said objects according to object type;

assigning priorities to said objects, according to object type;

selecting compression parameters for each of said objects, to said priorities; and compressing the object data according to corresponding compression parameters, thereby producing compressed data.

19. The method of claim 18, further comprising the steps of:

calculating a predicted size of said compressed data from said compression parameters;

comparing an actual size of said compressed data with said predicted size to determine a prediction error; and adjusting said compression parameters according to said prediction error.

20. The method of claim 19, wherein said step of adjusting comprises altering said compression parameters to obtain a higher compression ratio, when said actual size exceeds said predicted size by a certain amount.

21. The method of claim 19, comprising the further steps of:

storing said compressed data in an output buffer;

comparing a total size of the compressed data stored in said output buffer with said given size;

deleting at least part of the compressed data stored in said output buffer, if said total size exceeds said given size; and again compressing the data from which the compressed data thus deleted was produced, using stronger compression parameters.

22. The method of claim 18, comprising the further steps of:

selecting resolution reduction ratios for said objects, according to said priorities; and reducing a resolution of said object data according to said resolution reduction ratios.

23. The method of claim 19, wherein said object data comprise successive dot lines, and said steps of compressing, calculating, comparing, and adjusting are performed one dot line at a time.

24. The method of claim 19, wherein said steps of compressing, calculating, comparing, and adjusting are performed one object at a time.

25. The method of claim 18, comprising the further steps of:

calculating a total size of said object data; and storing said object data directly in an output buffer, without performing said step of compressing, if said total size is within said given size.

26. An apparatus for compressing object data describing a group of objects forming a page of a document to within a given size for transmission from a computing device to a peripheral device, comprising:

an object classifier, for reading header information about said objects, including information about object type, and classifying said objects according to object type;

a prioritizer coupled to said object classifier, for assigning priorities to said objects, responsive to object type;

a compression parameter selector coupled to said prioritizer, for selecting compression parameters for each of said objects, according to said priorities; and a data compressor coupled to said compression parameter selector, for compressing said object data using different methods having different compression ratios, according to the compression parameters selected by said compression parameter selector, thereby producing compressed data.

27. The apparatus of claim 26, further comprising a data buffer for storing said object data prior to compression by said data compressor.

28. The apparatus of claim 26, further comprising a buffer space calculator coupled to said data compressor, for calculating a predicted size of said compressed data from said compression parameters, comparing an actual size of said compressed data with said predicted size to provide comparison results, and reporting the comparison results to said compression parameter selector so that said compression parameter selector adjusts said compression parameters according to the comparison results.

29. The apparatus of claim 28, further comprising an object data buffer coupled to said object classifier, for storing the object data; and a rasterizer coupled to said object classifier, for converting the object data stored in said object data buffer to dot-mapped data and reducing a resolution of said dot-mapped data, according to resolution ratios specified by said compression parameter selector, said priorities, and the comparison results reported by said buffer space calculator.

30. The apparatus of claim 29, wherein said data compressor compresses said data by compressing the dot-mapped data in said object data buffer, one object at a time.

31. The apparatus of claim 30, wherein said compression parameter selector specifies said resolution ratios responsive to said priorities, so that a higher-priority object among said group of objects never has a higher resolution ratio than a lower-priority object among said group of objects.

32. The method of claim 1, wherein said data of said first type are dot-mapped text data, and said data of said second type are dot-mapped image data.

33. The method of claim 32, wherein said first compression method is a lossless compression method.

34. The method of claim 32, wherein said second compression method reduces a resolution of said dot-mapped image data according to said compression ratio.

35. The apparatus of claim 6, wherein said data of said first type are dot mapped text data, and said data of said second type are dot-mapped image data.

36. The apparatus of claim 35, wherein said first data compressor is a lossless data compressor.

37. The apparatus of claim 35, wherein said second data compressor reduces a resolution of said dot-mapped image data according to said compression ratio.

38. The method of claim 20, wherein said step of adjusting also comprises altering said compression parameters to obtain a lower compression ratio, when said predicted size exceeds said actual size by another certain amount.

39. The apparatus of claim 27, wherein said object data comprise successive dot lines, and said data compressor compresses said object data one dot line at a time.

* * * * *